US009671110B2

(12) United States Patent
Malavasi et al.

(10) Patent No.: US 9,671,110 B2
(45) Date of Patent: Jun. 6, 2017

(54) COMBUSTION PROCESS FOR FUEL CONTAINING VANADIUM COMPOUNDS

(71) Applicant: ITEA S.P.A., Bologna (IT)

(72) Inventors: Massimo Pietro Malavasi, Milan (IT); Grazia Di Salvia, Bari (IT); Nazario Di Salvia, Bologna (IT); Alvise Achille Bassignano, Rome (IT); Giampietro Tedeschi, Milan (IT)

(73) Assignee: ITEA S.P.A., Bologna (IT)

( * ) Notice: Subject to any disclaimer, the term of this patent is extended or adjusted under 35 U.S.C. 154(b) by 69 days.

(21) Appl. No.: 14/416,011

(22) PCT Filed: Jul. 22, 2013

(86) PCT No.: PCT/EP2013/065390
§ 371 (c)(1),
(2) Date: Jan. 20, 2015

(87) PCT Pub. No.: WO2014/016235
PCT Pub. Date: Jan. 30, 2014

(65) Prior Publication Data
US 2015/0153043 A1 Jun. 4, 2015

(30) Foreign Application Priority Data

Jul. 24, 2012 (IT) .............................. BA2012A0048

(51) Int. Cl.
*F23L 7/00* (2006.01)
*C10L 1/12* (2006.01)

(52) U.S. Cl.
CPC ............. *F23L 7/007* (2013.01); *C10L 1/1216* (2013.01); *C10L 1/1233* (2013.01); *F23L 7/002* (2013.01); *C10L 1/125* (2013.01); *C10L 2200/0213* (2013.01); *C10L 2200/0218* (2013.01); *C10L 2200/0254* (2013.01); *C10L 2290/10* (2013.01); *C10L 2290/141* (2013.01); *C10L 2290/146* (2013.01); *C10L 2290/148* (2013.01); *C10L 2290/60* (2013.01); *F23C 2900/99001* (2013.01); *F23L 2900/07007* (2013.01); *Y02E 20/322* (2013.01); *Y02E 20/342* (2013.01); *Y02E 20/344* (2013.01)

(58) Field of Classification Search
CPC combination set(s) only.
See application file for complete search history.

(56) References Cited

U.S. PATENT DOCUMENTS

| 2,781,005 | A | 2/1957 | Taylor et al. |
| 2,843,200 | A | 7/1958 | Rocchini |
| 2,884,369 | A | 4/1959 | Mattox et al. |
| 3,817,722 | A | 6/1974 | Scott |
| 4,116,820 | A | 9/1978 | Blytas |
| 4,498,402 | A * | 2/1985 | Kober .................... C10L 10/04 110/344 |
| 4,659,339 | A | 4/1987 | May et al. |
| 5,358,634 | A | 10/1994 | Rankel |
| 6,013,176 | A | 1/2000 | Greaney et al. |
| 6,206,685 | B1 * | 3/2001 | Zamansky ............. B01D 53/56 110/210 |
| 6,372,124 | B2 | 4/2002 | Reid et al. |
| 7,264,710 | B2 | 9/2007 | Hokari et al. |
| 7,947,167 | B2 | 5/2011 | Osaheni et al. |
| 2002/0112968 | A1 * | 8/2002 | Shiroto ................... C01G 31/00 205/496 |
| 2007/0240425 | A1 | 10/2007 | Malavasi et al. |
| 2010/0255431 | A1 | 10/2010 | Moliere et al. |

FOREIGN PATENT DOCUMENTS

| WO | WO 95/07408 A1 | 3/1995 |
| WO | WO 2004/094904 A1 | 11/2004 |
| WO | WO 2005/108867 A1 | 11/2005 |

OTHER PUBLICATIONS

International Search Report of PCT/EP2013/065390 dated Sep. 2, 2013.
Rocca E., et al., "Nickel oxide as a new inhibitor of vanadium-induced hot corrosion of superalloys—comparison to MgO-based inhibitor", J. Mater. Chem., vol. 12, pp. 3766-3772 (2002).

* cited by examiner

*Primary Examiner* — Kaity Chandler
(74) *Attorney, Agent, or Firm* — Arent Fox LLP

(57) ABSTRACT

Oxycombustion process for producing energy wherein low ranking gaseous, liquid, solid, optionally solid melting hydrocarbon fractions are used as fuels, having a vanadium content in amounts by weight from 50 to 5,000 ppm or higher, and alkaline metals Ma in amounts from 20 to 10,000 ppm, wherein magnesium is added as oxide, or as a magnesium compound forming MgO in the combustion process, or mixtures thereof and a silico-aluminate wherein the molar ratio $SiO_2:Al_2O_3$ ranges from 2:1 to 6:1; the combustor being refractored, isotherm or quasi-isotherm, flameless, working at temperatures in the range 1,250°-1,450° C. and under pressurized conditions, wherein the oxidant being used in admixture with water or steam, the ratio by moles oxidant:(water/steam) being comprised between about 1:0.4 and about 1:3, or the oxidant is used in admixture with flue gases recycled from the flue gases outletting the energy recovery equipments, wherein the water/steam amount is higher than 30% by volume, optionally by adding water to the recycled flue gases, the molar ratio oxidant:(water/steam) in flue gases being comprised from about 1:0.4 to about 1:3; the hydrocarbon fraction being fed in admixture with water or steam, the amount of water/steam being at least 30% by weight with respect to the hydrocarbon fraction.

17 Claims, No Drawings

COMBUSTION PROCESS FOR FUEL CONTAINING VANADIUM COMPOUNDS

CROSS-REFERENCE TO RELATED APPLICATION

This application is a National Stage entry of International Application No. PCT/EP2013/065390, filed Jul. 22, 2013, which claims priority to Italian Patent Application No. BA2012A000048, filed Jul. 24, 2012. The disclosures of the priority applications are incorporated in their entirety by reference.

The present invention relates to fuel combustion process of low ranking fuels containing vanadium from 50 to 5,000 ppm or higher and alkaline metals (Ma), preferably sodium, from 20 to 10,000 ppm, for obtaining flue gases showing, on a flue gas dry basis, a low content of fly ash, that is <100 mg/Nm$^3$, preferably <50 mg/Nm$^3$, negligible incombustible residues, that is a TOC (total organic carbon) amount by weight <1 ppm, IPA (polyaromatic hydrocarbons, mainly pyrenes) <10$^{-4}$ mg/Nm$^3$, in particular soot absent, vanadium or its compounds (determined as vanadium) being in amounts lower than 1 mg/Nm$^3$, and at any rate in the form of V$_2$O$_5$ in amounts <0.01 mg/Nm$^3$, NaVO$_3$ being not detectable at XRD. Further said flue gases not being able either to attack the building material of the combustor and of the energy recovery equipments, or to cause efficiency reduction due to adhesive fouling on the equipments used for the energy recovery.

More preferably the present invention relates to the use for the production of energy of commercially low ranking hydrocarbon fractions, such as for example petrolene and asphaltene, containing high amounts of vanadium in combustors working at temperatures in the range 1250°-1450° C., the combustors being a part of the energy recovery plants operating for 8,000 h/year or longer without interruptions for cleaning either the downhill energy recovery equipments or for substituting corroded parts or parts irremediably damaged by the sintered powders deposited by flue gases and without penalizing the punctual efficiency and the energy recovery; intrinsically adhesive compounds, in particular sulphates and soot being substantially absent/negligible in the residual powders.

It is well known in the prior art that the refining processes of the various types of crude oils for the production of commercial hydrocarbon fractions such as fuels, petrochemical loads, fuels for the production of energy, give heavy hydrocarbon fractions as by-products, in particular petrolene and asphaltene. These by-products cannot be directly used for the production of commercial hydrocarbon fractions and they find application for poorer and limited uses, for example road asphalts or they form particular fuels, for example Petcoke, pitches, vis-breaking residues suitable for the production of energy but only through very complex energy transformation plants, in order to overcome the negative effect, both technological and environmental, that would arise when used in conventional hydrocarbon plants. In fact in heavy hydrocarbon fractions, carbon compounds, polyaromatic hydrocarbons for example asphaltene, high molecular weight linear or branched hydrocarbons, for example petrolene, the compounds having chemical structures more difficult to be subjected to exhaustive combustion, are concentrated. For example, for Petcoke more complex plants are to be used, for example those used for fossil coal, that is with a number and complexity of equipments increased, in particular in the flue gas post-treatment section. As a matter of facts this represents a commercial downgrading of the fuel, besides creating problems in term of higher operation costs and environmental impact.

Another way for using the above heavy fractions as fuels is to transform them, e.g. by gasification, followed by complex gas cleaning operations, in order to be able to use the gas obtained in conventional energy gas combustors, for example combined cycle turbogas. Alternatively, the heavy fractions are subjected to complex catalytic reforming processes to obtain higher commercial value hydrocarbon fractions.

However these operations require significant investments and operative costs and dedicated plants. Of course the commercial downgrading of these fuels still remains due to some species concentrated in these fractions, for example sulphur and nitrogen remaining after hydrogenation treatments in refinery, and present in crude oil chemically bound to high molecular weight molecules, preferably concentrate in the heavy hydrocarbon fraction. The behaviour of the incombustible ashes and of some heavy metals, in particular vanadium and nickel, is similar.

It is well known that vanadium is a constituent of porphirins, typical substances of the orogenesis of fossil hydrocarbons and generally present in the various types of crude oils in proportion to the content of polyaromatic hydrocarbons. During the refining processes the bonded vanadium is concentrated in the heavy hydrocarbon fractions. This certainly reduces the problems in obtaining valuable commercial fractions by removing vanadium, but conversely, the problems related with the use of the heavy hydrocarbon fractions are further worsened. For example an average oil having an 105-110 API grade may contain vanadium in very variable contents depending on the extraction well, generally of the order of 50-100 ppm. However, in heavy fractions deriving from this crude oil, vanadium concentration can rise up to 200-300 ppm. When the heavy fraction, or the heavy oil are subjected to a separation process of asphaltene for obtaining upgraded oil, the vanadium is further increased in these fractions. For example in the asphaltene fraction the vanadium concentration can rise up to 500-700 ppm. It is also known that in the residues from catalytic conversion/gasification/reforming treatments of heavy hydrocarbon fractions vanadium can be of the order of some thousands of ppm.

It is also known that vanadium represents a remarkable problem for the health of human beings as well as for the environmental impact, and also a technological problem in industrial plants for its aggressiveness towards the various materials used, as insulating refractories, steels, high performance alloys (special steels).

Various methods for reducing the negative effects of vanadium in plants for transforming fuels into energy are known in the prior art. See for example U.S. Pat. No. 2,843,200 that describes a process for reducing the corrosive effect of the vanadium containing fractions, by injecting into the combustor an inhibitor formed by finely subdivided precipitate of hydrate calcium silicate, or the inhibitor is uniformly mixed with the fuel. In the background of this patent it is stated that the fly ashes, obtained by burning residual fuel oils containing substantial amounts of vanadium compounds, have an important corrosive effect on the building materials of the downhill energy recovery plants, for example there is a catastrophical oxidation of the turbine blades. The corrosive effect is deemed to be due to the presence of V$_2$O$_5$, formed during the combustion of residual fuel oils containing vanadium. This compound attacks various metals, their alloys and other building materials. The corrosive effect progressively increases with the flue gas temperature. Furthermore, the flue gas ashes containing vanadium form a hard and sticky material that deposits on the downhill equipment walls by thickening them and besides corroding them. By using the additive described in this patent, the fly ashes containing vanadium do not adhere any longer to the metal materials of the downhill equipments, but they deposit as non adherent easily removable powders. However it is noticed that the corrosive effect on the various materials of the plants is only delayed. In this patent it is taught to operate the combustor at relatively low working temperatures, of no more than about 750° C. (1,350° F., 732° C. in the examples). One drawback of the process is that the burning residues in fly ashes are in high amounts with consequent adhesive fouling of the downhill equipments. U.S. Pat. No. 2,781,005 describes the use of magnesium- and zinc-based inhibiting additives, both as oxides and as compounds generating oxides at the combustion temperatures, for the use of low grade residual fuel oils containing vanadium. The effect of the combustion flue gases at temperatures comprised between 600° and 800° C. on the energy recovery equipments, for example the blades of a turbine, are also described. The operative example is carried out at 650° C. The additives are fed into the combustor, optionally mixed with the fuel. In this way the corrosion is of the same level that takes place in the absence of vanadium. The composition of the zinc and magnesium oxides is such to lead to the formation of orthovanadates $M_3V_2O_8$ with contemporaneous disappearance of $V_2O_5$ from flue gases. In the patent it is stated that when the added amount of the additive is lower than that indicated, the corrosion is not substantially reduced, probably due to the presence of free $V_2O_5$ in flue gases. The drawback of the additives used in this patent is the same of the preceding patent. U.S. Pat. No. 3,817,722 describes the reduction both of the corrosion and of the fouling from sticky fly ashes on the walls of the downhill energy recovery equipments obtainable by adding compounds producing silica and magnesium oxide as silicon and magnesium sources, such to provide a ratio by weight $SiO_2/MgO$ higher than 2:1, preferably higher than 3:1, in the combustion of fossil fuels containing vanadium and alkaline metals. At least two parts by weight of magnesium/one part of vanadium and at least two parts by weight of silicon/one part of alkaline metals must be present. The higher the $SiO_2/MgO$ ratio, the better the benefits in terms of inhibition of the corrosion and fly ash deposition. When the sodium content is high, $SiO_2/MgO$ ratios even of 6:1 can be reached. In the patent it is reported that the low cost fuels, that is those containing vanadium, and optionally also alkaline metals and sulphur compounds, are difficult to be treated. In the background it is stated that the use of silica was already known for controlling the fly ash deposit on the energy recovery downhill equipments.

Other patents of the prior art describe the use of MgO and $SiO_2$ in the ratio 1/1 to 2/1. However, if combustion temperatures higher than 760° C. as indicated in the prior art are used, corrosion and fly ash deposit take place. Therefore the additives effective at these temperatures are ineffective at temperatures higher than 760° C. due to the occurrence of melting phenomena of fly ashes, with impact on corrosion and fouling. $SiO_2$ has been shown effective in modifying the fly ash nature and in preventing the fouling on the downhill energy recovery equipments and in inhibiting corrosion. In this way the ash melting temperature is increased so as to eliminate the presence of corrosive liquid phases. However this is true for temperatures up to 700° C. At temperatures in the range 815°-870° C. corrosion and fouling of the fly ash will occur again. In other words, the use of the prior art additives is quite ineffective in low cost/low ranking fuels containing vanadium at combustion temperatures higher than 800° C.

Systems for reaching temperatures higher than about 760° C. are based on the fuel pre-treatment through washing with water to remove the alkaline metals and then adding magnesium sulphate in a ratio by weight Mg/V 3/1. The drawback of this treatment is that a substantial fouling of the turbine blades of the downhill energy recovery equipments occurs with a progressive decrease of energy production. In practice the ratio magnesium/vanadium can be at most 3/1-3.5/1 for a good balance between the protection from corrosion and minimal energy production losses. However turbine operations must be interrupted for blade cleaning, carried out by washings. As a matter of fact one part of the modified ashes deposits on the turbine blades which must be stopped and subjected to washings with water. These cleaning operations require about 6 hours, therefore these treatments can be only carried out on turbines that can be cyclically stopped. It has also been tried to perform the washings by using milled nutshells for speeding up the operation, however with a little advantage. In the prior art, in order to improve the resistance to corrosion, attention has been paid to the building materials, by using special steels, in particular alloys containing nickel and cobalt. However the apparent improvement at temperatures of 400°-500° C. is not maintained at temperatures higher than 700° C. Consequently the equipments show a remarkably reduced working life in comparison with those wherein fuels not containing vanadium are used. The additive disclosed in U.S. Pat. No. 3,817,722 (supra) allows to carry out combustion up to temperatures of about 815° C. as shown in the examples. The drawback of this additive is the high ratio $SiO_2/MgO$ at least of 6:1, requested for obtaining a lower corrosion. Another drawback of that additive is that the corrosion phenomena are reduced but not eliminated. The temperature of 815° C. must not be exceeded, in order to avoid corrosions from melting ashes. Besides, when sulphur is present, $MgSO_4$ is also formed, that subtracts magnesium to the mentioned reactions. Magnesium sulphate is adhesive to the walls of the downhill equipments, thus lowering the energy recovery efficiency. Magnesium is used also in the cases of fuel gasification for producing synthesis gas to be used in boilers or in combined cycles, with effects similar to those provided by the above described art in direct combustors using low ranking fuels to produce hot flue gases. However also in these cases, before using synthesis gases in high yield thermodynamic cycles it is necessary to provide powder removal, by forming solid currents of problematic disposal (Vanadium cake), and further complex operations to remove residual vanadium, present in the form of an ultrafine particulate.

It is known in the prior art, see the article by E. Rocca e al. "Nickel Oxide as a New Inhibitor of Vanadium-induced Hot Corrosion of Superalloys-Comparison to MGO-based Inhibitor". J. Mat. Chem. 2002, 12, 3766-3772, that the use of fuels containing vanadium and sodium causes ash accumulation along the flue gas path. These ashes give rise to fouling and corrosion along the gas path as a result of the formation of reactive compounds having a low melting point. The additive used in this publication is formed by NiO—MgO usable up to 850°-1,000° C. The formation of nickel orthovanadate drastically reduces the corrosion and the deposit of ashes. The MgO effect on ashes is to stabilize vanadium under the form of mixed sodium and magnesium orthovanadate $NaMg_4(VO_4)_3$. However the favoured transformation of MgO to sulphate due to the sulphur present in the fuel implies feeding amounts of magnesium in excess in order to form a mixed orthovanadate, the excess being found in the flue gases as magnesium sulphate, whose adhesiveness is well known, to give compact deposits on the walls of the energy recovery equipments, with the known inconveniences. The publication concludes that NiO is an effective alternative to MgO to reduce the corrosion due to vanadium. In the publication it is stressed that chromium oxides and aluminium oxide give the corresponding orthovanadates. However these compounds in the molten state generate corrosion, the more important the higher the amount of sodium present. The MgO addition as inhibitor leads to the formation of mixed orthovanadate, that gives, as it is stated, a limited corrosion, but it increases the amount of ashes, due to the ratio in excess magnesium/vanadium, that are also adhesive. In the publication it is pointed out that, differently from the magnesium orthovanadate, nickel orthovanadate is insensitive to the presence of sodium. The mixed sodium and magnesium vanadates $NaMg_4(VO_4)_3$, even though they are refractory and inert, are low-melting and together with the mixed sulphates $Na_6Mg(SO_4)_4$, low-melting too (melting point around 500° C.), are liquid at the operating temperatures of the energy recovery equipments, and cause the ash sintering and fouling of the downhill equipment walls.

It is also known in the prior art from the above mentioned publication and from patent application US 2010/0255431, that the species of vanadium particularly large spectrum aggressive on materials is the alkaline methavanadate $MeVO_3$, wherein Me is sodium or potassium. It is also known that vanadium can be transformed into compounds such as nickel and magnesium orthovanadates ($M_3(VO_4)_2$) and magnesium pyrovanadates ($MgV_2O_7$), chemically and thermally very stable. They are completely inert and non aggressive towards the building materials and besides they are free from any catalytic activity in undesired parallel reactions such as the conversion of $SO_2$ into $SO_3$ in an oxidizing environment, at temperatures in the range 250°-700° C. (i.e. in the range of interest for the thermal recovery of hot flue gases). However the transformation reactions of vanadium to orthovanadates are slow and not quantitative and are inhibited by the presence of iron (for example $Fe_2O_3$ in the formation of nickel orthovanadate), subjected to competitive interferences (for example $Na_2O$, $Na_2SO_4$, on magnesium orthovanadate to give metavanadate), and furthermore negatively affected by the presence of sulphur (magnesium preferably consumed to sulphate), without being possible to eliminate the aggressive species $NaVO_3$, and with formation of submicronic corpuscular vanadium oxide, difficult to remove from flue gases. In particular the patent application describes a process for operating a thermal plant comprising a combustion chamber and a turboexpander, fed with a fuel containing vanadium, sulphur and optionally sodium, wherein boron and magnesium are fed in amounts such that the molar ratio of sodium $s=Na_2SO_4/V_2O_5$, of magnesium $m=MgO/V_2O_5$ and of boron $b=B_2O_3/V_2O_5$ is such that $m \geq 3+2b-s$ and $m \leq 3+3b-s$ and b ranges from 0.5 to 3.5, preferably from 1 to 3, so that the combustion products mainly comprise magnesium orthovanadate, boron and magnesium mixed oxide and optionally sodium borate. With the used additive there is a lower corrosion and an increase of the ash melting temperature so as to avoid the formation of corrosive and sticky liquid ashes. In this way the combustor can be operated at temperatures higher than those of the prior art, up to 1140° C. In the examples the combustion temperature is of 1090° C. up to 1120° C. The additive of this process allows less frequent turbine cleaning compared to the additives mentioned in the preceding prior art. Likewise important is the combustion temperature risen up to 1140° C., therefore with higher thermodynamic efficiencies of the industrial cycle and less stops for cleaning. By passing, it is observed that the mathematic formulation for the above mentioned quantitative expression of the additives could also consider the case of negative values of m when s takes high values. At any rate it is pointed out that the drawback of this process is that fly ashes are still in high amounts and the frequency of the plant stops for the equipment cleaning is still high (fouling only reduced). According to this patent application it is necessary to operate at temperatures not higher than those indicated to avoid both the melting of the mixed oxide mixtures, potentially aggressive, but especially their sintering to give particularly thick deposits difficult to be removed from the downhill energy recovery equipments and in particular from the turbine blades. In summary this patent application describes the use of mixed oxides $MgOE_yO_z$ wherein E is an element of the group IIIa, IVa, IIIb, IVb, VIII or of the Lanthanide series. The second oxide $E_yO_z$ can be selected from the group comprising $B_2O_3$, $Al_2O_3$, $Fe_2O_3$, $SiO_2$, preferably $B_2O_3$, as exemplified. With this additive high-melting, friable, refractory and not sticky ashes are obtained, that can be easily removed by dry cleaning or washing with water. The ratios that are to be used between magnesium oxide and the second oxide are given by the above reported equations. The use of these mixed oxides is shown effective in protecting magnesium from the interference of sulphur (to give sulphate) through the favoured transformation into mixed borate, and in subtracting sodium from the formation of the dangerous sodium metavanadate, with the purpose of increasing the ash melting temperature as said above, starting from molar ratios magnesium/vanadium ($MgO/V_2O_5$) of 7 (while the stoichiometric would be 3), up to a molar ratio of 9, in order to obtain the maximum increase (1140° C.) of the melting temperature/sintering of the fly ash and avoid the presence of corrosive liquid fly ash. Although the obtained ashes are indicated to be not very sticky (marked difference with respect to the sticky ashes of $MgSO_4$) and not melting (and not adhesive up to a temperature of 1,140° C.), nevertheless the drawback of the mentioned additives resides in the fact that in order to render vanadium inert, high dosages of MgO are used, to which $B_2O_3$ is added (molar ratio $B_2O_3/V_2O_5$ equal to 3). Therefore, even if the described additive represents for some aspects an improvement as for the higher combustion temperature, up to 1140° C., and for the less sticky ashes (zeroing of Mg sulphate), it however implies high dosages (as a sum of MgO and of $B_2O_3$) of additives, then found in significant amounts as fly ashes in flue gases, with the well known problems for the technological use of flue gases.

The poor performances of the described prior art, as regards to the additives of vanadium containing fuels, have led towards other solutions, such as the direct pretreatment of the fuel in order to activate reactions to eliminate the effects of the corrosion due to vanadium.

See for example U.S. Pat. No. 2,884,369 wherein the fractions containing heavy metals and vanadium are treated with active coal having a high surface area to remove iron, nickel and vanadium at temperatures up to about 400° C. This temperature is specific for the selective removal of the polluting metals and such to avoid cracking of the heavy hydrocarbon oil.

Another type of pre-treatment is reported in U.S. Pat. No. 4,116,820, that describes a process for removing heavy metals such as nickel and vanadium from heavy hydrocarbon oils by pre-treatment with acidified active coals, carried out at temperatures from 370° to 450° C.

U.S. Pat. No. 6,013,176 describes a process for removing heavy metals from mineral oil by using hydroxides and carbonates of metals of the first and second group, in the presence of a gas containing oxygen and of a phase transfer agent at temperatures from 100° C. to 180° C.

U.S. Pat. No. 6,372,124 describes a process for purifying hydrocarbons wherein an absorbing material formed (% by weight) by 50-96% alumina and 50-4% calcium oxide and magnesium oxide, wherein the ratio by weight CaO:MgO ranges from 90:10 to 50:50 is used, the surface area being greater than 100 m$^2$/g, the pretreatment being carried out at a temperature between 20 and 450° C.

U.S. Pat. No. 7,947,167 describes a method for purifying low-grade fuels from vanadium, nickel and other metals, by contacting heavy hydrocarbon fractions with an absorbing agent having a high surface area, such as for example alumina, aluminum hydrate, molybdenum oxide, petroleum coke, activated coal, zeolites, clays, silicates, inorganic oxides or combinations thereof.

U.S. Pat. No. 5,358,634 describes a process for removing metals from heavy oils by treatment with hydrogen on active coal at temperatures from 260° to 649° C. and pressure from 0 to 272 atm.

U.S. Pat. No. 7,264,710 describes a process for removing vanadium by treatment of heavy hydrocarbon fractions in the presence of water in supercritical conditions, and of an oxidizing agent. The process is operated at temperatures comprised between 350°-600° C., obtaining the reforming of the hydrocarbon phase and the oxidation of vanadium, which is removed in the presence of a scavenger (calcium or iron), with which vanadium forms mixed oxides.

In general the fuel pre-treatments described in the prior art are effective to remove vanadium-nickel in the light fractions (fuel requalification), but less effective to treat heavy hydrocarbon oils (asphaltenes, petrolenes) when the C/H ratio increases. These pre-treatments represent however a remarkable increase of the complexity of the integral process of using these fuels and they require dedicated plants.

The need was therefore felt to have available a combustion process allowing the direct use of low ranking hydrocarbon fractions and fuel residues containing vanadium, in amounts (by weight) from 50 to 5,000 ppm or higher and alkaline metals Ma, generally sodium, ranging from 20 to 10,000 ppm, at high combustion temperatures, higher than 1140° C., without the known drawbacks due to the vanadium aggressiveness towards the plant materials, wherein the addition of remarkable amounts of additives were not necessary and in any case without the production of flue gases with high fly ash concentrations so as to carry out the technological use of the hot combustion flue gases in the energy recovery plants for at least 8,000 h/year without dangerous emissions of heavy metals in the environment, without substantially attacking/corroding the combustor refractories and the building material of the downhill equipments in the case of thermal recovery by production of steam or heat, without substantially having residual and aggressive ashes in the case of use of pressurized hot flue gases coming out from the combustor in turbo-machinery for the energy recovery, that is obtain flue gases having a low content of fly ashes, <100 mg/Nm$^3$ flue gas dry basis, preferably <50 mg/Nm$^3$ flue gas dry basis, negligible incombustible residues with a TOC concentration <1 ppm by weight, IPA<10$^{-4}$ ppm by weight, in particular soot-free, vanadium or its compounds being in amount lower than 1 mg/Nm$^3$ flue gases dry basis, and at any rate not detectable at the XRD as NaVO$_3$, and as V$_2$O$_5$ in amounts <0.01 mg/Nm$^3$ flue gases dry basis, said flue gases being nor aggressive to the plant building material or such as to reduce the efficiency of energy recovery due to adhesive fouling on the walls of the plants used for the heat exchange in the section downhill of the combustor.

The Applicant has surprisingly and unexpectedly found the solution to the above technical problem; that is a combustion process capable to chemically transform vanadium quantitatively into non aggressive inert species and the removal of the transformed Ma, in particular sodium, as a non aggressive species.

An object of the present invention is an oxycombustion process of low ranking gaseous, liquid, solid, optionally melting-solid, hydrocarbon fractions used as fuels, having a vanadium content in amounts by weight from 50 to 5,000 ppm or higher, and alkaline metals (Ma), generally sodium, in amounts from 20 to 10,000 ppm, wherein magnesium is added as oxide, or as a magnesium compound forming MgO in the combustion process, or mixtures thereof, and a silico-aluminate is added, wherein the molar ratio SiO$_2$:Al$_2$O$_3$ ranges from 2:1 to 6:1; the combustor being refractored, isotherm or quasi-isotherm, flameless, operating at temperatures in the range 1,250°-1,450° C., under pressurized conditions, wherein the oxidant is oxygen, the oxidant being used in admixture with water or steam, the ratio by moles oxidant:(water/steam) being comprised between about 1:0.4 and about 1:3, or the oxidant is used in admixture with recycled flue gases, coming from the flue gases outletting the energy recovery equipments, the water/steam amount being higher than 30% by volume, optionally by adding water to the recycled flue gases, the molar ratio oxidant:(water/steam) in the flue gases being as above; the hydrocarbon fraction being fed in admixture with water or steam, the amount of water/steam being equal at least to 30% by weight with respect to the hydrocarbon fraction.

Preferably the pressure in the combustor is comprised from higher than or equal to about 102 kPa to about 5,000 kPa, preferably higher than or equal to about 200 kPa and up to about 3,500 kPa. The oxygen used is pure oxygen or technical oxygen, that is having an oxygen titre higher than 80% by volume. The complement to 100% being formed by inert gases and/or nitrogen.

Technical oxygen is obtained from air by cryogenic distillation, or by differential absorption on zeolites, or by separation with ceramic membranes at high temperature, etc. Technical oxygen is available on the market.

In the oxycombustion process technical oxygen having an oxygen content >98.5% by volume is preferably used. Generally also oxygen having 92-94% titre VSA (vacuum swing absorption) and 88-92% VPSA (vacuum pressure swing absorption) can be used. The oxygen in the process of the invention is normally used in excess with respect to the stoichiometric amount required for the reaction. Values from 1% to 3% molar of unconverted oxygen are preferably present in flue gases.

By alkaline metals (Ma), the metals of the first group of the periodic system, generally sodium, are meant.

A combustor works under quasi isothermal conditions when in all its inner zones the temperature in degrees Celsius varies at most of ±5% with respect to the base combustion temperature. This means that in practice the combustor does not show significant cold zones.

As magnesium compounds forming MgO during combustion both the water-soluble salts, for example MgSO$_4$, and the water-insoluble salts are used, the latter are fed to the combustor in the form of an aqueous suspension.

Preferably the molar ratio Mg:V, wherein vanadium is that contained in the fuel, is in the range 1:1-2:1, more preferably from 1.25:1 to 1.75:1.

Preferably the molar ratio Mg:Al, wherein Al is in the silico-aluminates is in the range 0.5:1-1:1, more preferably 0.6:1-0.8:1.

The total magnesium added is the sum of the Mg used for vanadium and of Mg used for aluminum according to the equation reported below.

The silico-aluminate has a molar ratio $SiO_2/Al_2O_3 > 2$. The silico-aluminate amount, on a molar basis, with respect to MA, generally sodium, is such that the molar ratio Al/Ma>1 preferably ranges from 1 to 1.5.

A formula for calculating the total magnesium amount (by moles), is the following:

$$m = V \cdot x + Al \cdot y = V \cdot (x + y \cdot f \cdot z)$$

wherein:
m=total moles of magnesium,
the ratio by moles being the following
x=Mg:V,
y=Mg:Al,
z=Al/Ma,
f=Ma/V (in the fuel).

As silico-aluminates, those of the alkaline-earth metals are used, preferably a magnesium silico-aluminate of natural origin (e.g. cordierite), having a various titre of magnesium).

Soot generally means an organic fuel material under the form of aggregates, having particle size from 10 nm up to about 10 μm, more in detail oxygen-rich organic macromolecules based on carbon and hydrogen (hydrocarbon macromolecules partially degraded by oxidation reactions), residual in flue gases owing to an incomplete combustion.

When other heavy metals different from vanadium are present in the starting fuel, as for example nickel, iron and cobalt, in the combustor of the invention they are transformed into the corresponding oxides. The Applicant has unexpectedly and surprisingly found that the above oxides promote the transformation of vanadium compounds into orthovanadates which, as said, are stable and non aggressive. The amount of these metals present in the fuel substitutes equimolar amount of the magnesium used to convert vanadium into orthovanadates.

The amount of water or steam to be mixed with the fuel preferably is not higher than 80-90% by weight with respect to the weight of the hydrocarbon fraction. Above this limit the added amount of water can significantly affect the thermal recovery efficiency. Preferably the combustor operates at temperatures in the range 1300°-1400° C.

Among solid fuels, hydrocarbon solids brought to melting/liquefaction by heating and fed to the combustor as viscous liquids, can also be used.

Solid fuels can also be fed after gasification into the combustor of the invention.

Examples of solid low ranking hydrocarbon fractions that can be used are the following: asphaltene, petrolene, carbonaceous substances (in general compounds having high values of the ratio carbon/hydrogen), Petcoke, carbonaceous residues (ex. PDX, partially oxidated hydrocarbons) of the petrochemical processes, vis-breaking bottoms.

Preferably the addition of magnesium is carried out by feeding an aqueous solution of magnesium sulphate.

Preferably the silico-aluminate is a natural magnesium silico-aluminate, commercially available, such as for example cordierite of general formula $Mg_2Al_4Si_5O_{18}$, which supplies part of the magnesium and, if requested, it is optionally added with silica in order to obtain a ratio $SiO_2:Al_2O_3$ indicated above. Generally the added silica is colloidal (fumed silica).

The added magnesium amount depends on the content of vanadium and of Ma alkaline metals, generally sodium, in the fuel. Higher ratios of magnesium with respect to those of the invention, for example Mg:V=4:1 and Mg:Al=3:1, or higher, can be used without bringing any substantial advantage for the combustion process, with an increase of plant operating costs.

The isotherm and flameless combustors are known in the prior art, see for example patent application WO 2005/108867 and WO 2004/094904 in the name of the Applicant, herein incorporated by reference.

In the process of the invention the fuel residence time in the combustor preferably ranges from 0.5 seconds up to 30 minutes, more preferably from 2 to 10 seconds. It is possible to use also longer times, if desired.

At the bottom of the combustor, there is a tank for collecting molten ashes dripping therein in liquid state. In the tank ashes are cooled, for example in a water bath, and transferred in a vitrified solid state into static separators (settlers).

When the flue gases obtained in the combustion process of the invention are used to produce energy by steam production, or to generate heat for other applications, the flue gases outletting the combustor are cooled by mixing them with cold recycled flue gases (from thermal recovery) in a mixer, in ratio hot flue gases/cold flue gases such that the final temperature of the gaseous mixture is about 1,100 K. The decrease of temperature obtained in this way, by strict recycling of flue gases outletting the thermal recovery plant, takes places without enthalpic cycle penalizations (isoenthalpic operation) and has no impact on the energy characteristics of the produced steam, as the technological maximum temperature of the superheated steam SH acceptable by turbines, is of 903 K. Therefore this does not imply any penalization of the yields of the transformation cycle from thermal energy to mechanical/electric energy, and allows to obtain a net advantage of using equipments for thermal recovery, with wall heat exchange between flue gases and water/steam, built with materials of common use for the same service in conventional power plants.

The combustor refractories of the invention are conventional, preferably of alumina type with the addition of about 10% chromium and about 4% zirconium.

The flue gases corresponding to the net gaseous product of combustion can be removed from the circuit under pressure by lamination (i.e. by throttling) to atmospheric pressure. The conventional post-treatments to remove the residual ashes and acidity are carried out, for example by filtration on a bag filter and neutralization by washing with alkalies (lime milk). When $CO_2$ has to be recovered, if the fuel produces little chemical reaction water, a preferred solution is to operate neutralization (washing) under pressure.

Preferably, the part of the flue gases corresponding to the net gaseous product of the combustion is withdrawn downstream the mixer and expanded to yield mechanical work, and then sent to a thermal recovery unit and the atmospheric post-treatment of flue gases. The expansion can be carried out directly through a turboexpander made of conventional building materials, as flue gases are substantially free from fly ashes and have a temperature of about 1100 K.

In a still more preferred solution for the energy recovery by turbomachinery, the part of flue gases corresponding to the net gaseous product of the combustion is directly withdrawn at the outlet of the combustor, and sent to conventional turbomachines that, owing to suitable engineering modifications of cooling/protection of the metal surfaces by a steam layer, can operate with flue gases up to a temperature of 1,300° C., with a distinct advantage of the yield of the power cycle. In fact, in this way it is possible to combine a cycle of the Joule-Bryton type, with the combustor pressurized for example at 1,500 kPa releasing hot flue gases with a flow rate equal to the net product of the combustion, directly to a turboexpander, with a Rankine cycle that withdraws heat from the recycled hot gases. In this way starting from low ranking fuels yields of transformation from thermal energy to electric energy higher than 55% can for example be reached.

The process of the present invention allows therefore the possibility to use even the above indicated low ranking fuels containing vanadium for high energy efficiency plants having a low environmental impact. These fuels otherwise are not in practice usable in conventional energy plants, as they require very complex and expensive plants and in any case operating with lower yields.

In the process of the invention the vanadium is recovered in a substantially quantitative way from low ranking hydrocarbon fractions. Vanadium is isolated as orthovanadate and pyrovanadate, among which nickel orthovanadate, together with other melting ashes, under the form of nitrous, inert beads of easy handling, having a high concentration of useful V and Ni metals largely used in metallurgy.

By the process of the invention the Applicant has surprisingly and unexpectedly found the following advantages:

- speeding up of the reactions, also those lazy according to the prior art, up to the quantitative conversion of $V_2O_5$ into orthovanadates/pyrovanadates under gas flow conditions;
- segregation of vanadates (both ortho- and pyrovanadates) and of mixed silico-aluminates under the form of liquefied ashes, collected on the refractored walls of the combustor and dripped to the bottom of the combustor, solidified in slags having a vitrous appearance (beads), available as a concentrate of V and Ni for recovery in metallurgy;
- the nickel, that on a molar basis is present in these fuels in an amount in general lower with respect to vanadium, is transformed into nickel orthovanadate and it is available concentrated for recovery from vitrous slags;
- absence of chemical attack on the refractories of the combustor, also for the conventional ones having an alumina basis, such as for example alumina additivated of about 10% chromium and about 4% zirconium, manufactured in high fired bricks;
- $SO_3$ is reduced to negligible values (lower than about 2 mg/Nm$^3$ of flue gases dry basis) and absence of the aggressive sulphuric condensates on the metal walls of the thermal recovery equipments,
- the combustion is exhaustive, in combustion fumes soot is absent, TOC <1 ppm and with IPA (polyaromatic hydrocarbons, mainly pyrenes) <10$^{-4}$ mg/Nm$^3$ flue gas dry basis.

The flue gases outletting the combustor operated with the process of the invention, sent to the heat recovery section, besides being substantially soot-free and with IPA and TOC within the above indicated very low limits, surprisingly and unexpectedly have given the following results at the analytical characterization:

- fly ash <100 mg/Nm$^3$, preferably <50 mg/Nm$^3$ flue gas dry basis,
- concentration of magnesium in flue gases, both in the form of oxide and sulphate <1 mg/Nm$^3$ flue gas dry basis, therefore negligible both for the corrosion and for the fouling of the walls of the equipments downhill of the combustor,
- vanadium, under the form of inert orthovanadates, generally of Ni and Mg and under the form of inert pyrovanadates, generally of Mg in amounts, expressed as vanadium, ≤1 mg/Nm$^3$ flue gas dry basis; furthermore $V_2O_5$ (including the submicron particulate) <0.01 mg/Nm$^3$ flue gas dry basis,
- $SO_3$≤2 mg/Nm$^3$ flue gas dry basis,
- NiO≤1 mg/Nm$^3$ flue gas dry basis.
- $NaVO_3$ not detectable by XRD and SEM analysis of the microaggregates.

These features of the process of the present invention are maintained, surprisingly and unexpectedly even for very high inletting concentrations of heavy metals (Cr, V, Ni), by using fuels containing for example up to 5,000 ppm by wt of vanadium and 2,000 ppm by wt of nickel, and with fuels difficult to be converted such as for example asphaltenes, residual carbonaceous ashes.

The effect to have flue gases with the described characteristics implies the reduction of fouling from sticky compounds on the walls of the equipments downhill of the combustor to levels that do not influence their efficiency for a time comparable to the operating factor of a non critical industrial plant (8,000 h/year). More specifically it is deemed that the absence of fouling is due both to the low content of organic non combustible residues and to the likewise low content of magnesium sulphate.

Besides the absence of fouling, the transformation reactions of vanadium into orthovanadates and pyrovanadates obtainable with the process of the invention, combined with very reduced residual amounts of $SO_3$ in flue gases allow, as said, an high operating factor. In fact it has been found by the Applicant, surprisingly and unexpectedly, that there are no corrosion phenomena of the building materials (steel, stainlesss alloys and high performances stainless alloys) from both vanadium and the sulphuric acid condensates in the equipments downhill of the combustor.

The process of the present invention allows to decrease the emissions of the regulated substances (organic compounds, heavy metals) and to reduce, by simplifying them, the unit operations for the post-treatment of the flue gases, as indicated above. In practice only filtration on a bag filter is carried out, with the filtrate recycled to the plant feeding, and neutralization (DeSO$_x$) of the flue gas sent to the stack.

More in detail, by DeSO$_x$ it is meant the equipment wherein sulphur oxides in flue gases are neutralized.

It has furthermore been found that it is possible to operate the combustor under the above mentioned conditions also by feeding fuel containing alkaline metals in considerable concentrations, for example amounts of alkaline metals, in particular sodium and potassium, even up to 10,000 ppm, corresponding to the maximum amount in low ranking hydrocarbon fractions.

In the combustor of the invention takes place:

- the removal of the alkaline metals, mainly sodium to the formation of the corresponding metavanadates, in particular of the sodium metavanadate, by the competitive reaction with the mixed oxide $SiO_2$:$Al_2O_3$ in the indicated ratios, with the consequent release of magnesium,
- segregation under molten state of the alkaline salt, in particular the sodium salt with the mixed oxide (compounds containing $SiO_2$.$Al_2O_3$ for example silico-aluminates) in the combustor, that is englobed in the nitrous slags formed by inert vanadates and by the fuel ashes.

In the process of the present invention this is obtained also when the used fuel contains very high alkaline metal concentrations, as indicated above.

According to a non binding theory, the Applicant believes that under the operating conditions in the combustion process according to the present invention the following reactions take place:

the flameless combustion conditions decouple/remove part of the catastrophic parameters (non linear parameters) that confer a chaotic character to the oxidation phenomena of the conventional flames. This allows the expansion of the oxidative phenomena to the whole combustor volume in an orderly and predeterminable way with consequent exhaustive oxidation of the fuel species without soot formation, and the IPA are reduced to insignificant values, the high and uniform temperature in the combustor favours the disassociation of the alkali metal and magnesium sulphates, to give the corresponding oxides:

$$M_xSO_4 \rightarrow M_xO+SO_3 \text{ (being M=Ma with } x=2, \text{ being M=Mg with } x=1)$$

and the reaction of $SO_3$ to give $SO_2$:

$$SO_3 \rightarrow SO_2+\tfrac{1}{2}O_2$$

magnesium is entirely available as MgO oxide and it is in a sufficient amount to quickly and exhaustively react with $V_2O_5$ coming from the thermal oxidation of vanadium contained in the starting low ranking fuels e.g. in porphirins, as there are no competitive reactions wherein the magnesium oxide can be involved, being alkaline metals Ma, e.g. sodium the only competitors to give the dangerous metavanadate, subtracted from the reaction to give mixed silico-aluminates. A stable and chemically inert magnesium orthovanadate is formed:

$$3MgO+V_2O_5 \rightarrow Mg_3V_2O_8$$

and magnesium pyrovanadate:

$$2MgO+V_2O_5 \rightarrow Mg_2V_2O_7$$

$V_2O_5$ reacts quantitatively without being it necessary to respect a definite stoichiometry Mg—V, as both the positive and the negative deviations from the stoichiometric amount of the orthovanadate are absorbed by the formation of pyrovanadates when the Mg amount is in defect and when the Mg amount is in excess, mixed oxides are formed according to the reaction:

$$zMgO+yM_pO_q \rightarrow (MgO)_z\text{-}(M_pO_q)_y$$

wherein M=Ma is a metal, z and y are integers that mix with melted orthovanadates, the Applicant has found that in the process of the invention alumina and silica, singly taken, are unable to react preferentially with Ma, e.g. sodium (with respect to the formation of netavanadate of Ma, e.g. sodium). The same with potassium and with the other alkaline metals.

It has been surprisingly and unexpectedly found that silico-aluminates having a high molar ratio $SiO_2:Al_2O_3$ (for example 6:1), at temperatures above 1,250° C., preferably react with alkaline metals, in particular sodium and/or potassium, to give $MaSiO_4$ together with magnesium aluminosilicates and magnesium silicates according to the reaction:

$$\alpha Mg_2Al_4Si_5O_{18}+\beta Ma_2SO_4 \rightarrow 2\beta MaAlSiO_4+\gamma Mg_2SiO_4+\delta MgAl_2O_4$$

wherein $\alpha$, $\beta$, $\gamma$ and $\delta$ are the reaction coefficients. Surprisingly and unexpectedly it has been found that this reaction is quick and effective under gas flow conditions, and it results evident from the analysis of the phases detected by XRD on the outletting ashes.

It has been found surprisingly and unexpectedly that it is sufficient that the Al/Ma (e.g. Na) ratio is higher than 1 to have Ma, e.g. sodium quantitatively transformed into the corresponding silico-aluminate, nickel, present as NiO oxide at the temperatures at which the combustor is operated, quickly combines with $V_2O_5$ to give a very stable and inert orthovanadate according to the reaction:

$$3NiO+V_2O_5 \rightarrow Ni_3V_2O_8.$$

This reaction is influenced only by the presence of high concentrations of iron oxides in the inletting ashes, that are competitive in the formation of vanadates, but of no practical effect on the vanadium content in the flue gases outletting the combustor.

Furthermore, in the preferred temperature range and for a suitable residence time, preferably ≥2 sec, in the combustor the formed chemical species melt together with the non combustible ashes (mixtures of oxides) contained in the fuel and are subjected to liquid coalescence so to collapse as drops on the combustor walls, accumulating in a substantially quantitative way (>99% with respect to the ash balance) at the combustor bottom.

Without being bound to any theory, it is believed that with the process of the invention the condition is achieved that reactants and products, normally subjected to an almost not controllable complexity of multiple reaction paths, multiplied by a multiplicity of operating conditions, in the present invention are only those above indicated and therefore very well controllable under flameless conditions (volume combustion), without significant formation of other species downstream the combustor, as the residual fraction of pollutants in the outletting flue gases is very low; and mainly (the following data are referred to 1 Nm³ flue gas dry basis):

fly ash residue <100 mg/Nm³ wherein:
Mg<1 mg/Nm³,
$SO_3$≤2 mg/Nm³,
orthovanadates and pyrovanadates, expressed as V<1 mg/Nm³ and $V_2O_5$<0.01 mg/Nm³.
alkaline metavanadates, generally $NaVO_3$, not detectable in ashes by XRD techniques and SEM analysis of the microaggregates.

In the outletting flue gases there is no significant presence of chemical species capable to give undesired side reactions, such as for example $V_2O_5$, $SO_3$, $MgSO_4$ and there have been inactivated the chemical species that could regenerate downstream of the combustor the undesired species (the mass effect is missing), even at decreasing temperatures but for relatively longer residence times, for example the reaction of magnesium oxide to give again sulphate (sticky ashes), and the subsequent reactions of the magnesium sulphate with magnesium pyrovanadate to form again $SO_3$.

Still according to a not binding theory, the Applicant thinks that in the process of the invention besides the positive effects above said, it has to be taken into consideration the quenching effect on the combustion flue gases of cold recycled flue gases (after heat recovery). That is a first rapid decrease of the flue gas temperature down to 1100 K (much lower temperature than the normal convectives of the prior art), takes place, that brings the kinetic quenching of the possible post-reactions among the species formed in the combustor and residual in the flue gases in the temperature range between 1,700 and 1,100K (from the combustor to the quencher).

In the temperature range from 1,100 to 520 K, essential for the heat energy recovery, it is instead critical to have the total conversion of $V_2O_5$ that is the absence of $V_2O_5$ in the flue gases. Otherwise, in the range 1,000-800K the total conversion of $SO_2$ to $SO_3$, catalyzed by $V_2O_5$, would take place and thus the reappearance of this chemical species responsible for the disastrous sulfur corrosion in the heat recovery equipments.

In this connection it can be added, according to a non binding theory, that the formation of $V_2O_5$ particles under gas flow conditions can be hypothesized also on the basis of experimental elements (see methodology (1a) in the examples).

Undoubtedly the chemistry and physical chemistry of the vanadium oxides is made very complicated by the interactions with other metal oxides always present in fuels/industrial processes, with masking effects difficult to overcome also with the most sophisticated characterizations of the flue gases. However blank tests (without interferences) can be carried out. Methodology (1a) points out that vanadium alone, at temperatures of 1300-1400° C., gives rise to an interaction with the alumina of the tubular reactor shown by a soft colouring, and however in quantitative low amounts. Vanadium is transformed prevailingly into $V_2O_5$ particles (submicron sizes), not filterable on a 0.1 μm filter, not wettable, and that cannot be removed with the usual scrubbing processes, even by using acid solutions and with high oxidizing power in conventional high efficiency drexels. Only with a very high contact surface, by using large size drexels, a satisfactory percentage of removal of the introduced vanadium equal to 70-80%, can be obtained, by using a working solution acidified with nitric acid to pH 0.5 and brought to an oxidation potential of 1.4 eV with hydrogen peroxide.

Always according to a not binding theory, in the prior art the complex interactions of $V_2O_5$ with other oxides do not allow to remove from the population of chemical species containing vanadium, outletting from the combustors, $V_2O_5$ particles and sodium metavanadate. On the contrary the quantitative conversion of $V_2O_5$ and sodium into sodium silico-aluminate under gas flow conditions, is obtained, surprisingly and unexpectedly with the process of the present invention. The solutions proposed by the prior art are not effective in reducing the attack of vanadium on the materials of the downhill equipments, as it is shown by the presence of vanadium downstream the flue gas cleaning processes, even after several and complex operations carried out downhill of the combustion/gasification processes, as in the case of combined cycle turbogas, operated with synthesis gases from gasification.

On the contrary, with the process of the invention surprisingly and unexpectedly, as said, the $V_2O_5$ amount is <0.01 mg/Nm$^3$ flue gas dry basis, i.e. practically below the analytical sensitivity limit, (see the examples, methodologies (1a), (1b) and 1(c)), and the typical traces of $V_2O_5$ are not detectable by EDX and SEM characterizations. Likewise sodium metavanadate is not detectable in the accumulated powders collected on the sampling filter.

It has also surprisingly and unexpectedly found that by increasing the pressure in the pressurized oxycombustion process of the present invention, even without substantially modifying the total amount of the residual ashes in the flue gases outletting the combustor, the vanadate concentration is instead reduced. For example, the temperature being equal, by operating at a pressure of 11 barg (bar gauge-relative pressure) the total amount of the residual ashes is slightly reduced with respect to that obtained at the pressure of 3 barg, while for vanadium (orthovanadates and pyrovanadates) under the same conditions a significant reduction of about ⅓ is obtained.

In addition to the analytical characterization data that, as seen, exclude the presence in flue gases of undesired chemical species (MgO, $V_2O_5$ and $NaVO_3$) up to the sensitivity limit of the analytical method, a confirmation of their substantial absence comes from the analysis of the materials used in the plant after many working cycles, for example of 2,000 h/year. Inspection of the internal surfaces of the combustor (refractories) and of the surfaces of the downhill equipments reveals that no degradation has occurred. This is a further confirmation of the absence of aggressive species as evidenced by the chemical characterization of the outletting flue gases. Therefore there is no interaction of the residual vanadium with these materials (for example carbon steel (CS) and stainless steel (AISI 304) in the whole range of the working temperatures, from 750° C. of AISI 304, from 380° C. of CS down to room temperature.

Furthermore the obtainment of flue gases substantially free from aggressive species directly at the outlet of the combustor, the disappearance of corrosive phenomena on the materials, of erosive phenomena from powders, and of fouling of the surfaces, allows on the whole to arrange the process flow rates of the flue gases necessary for:
  attemperation of the combustor, in condition of oxycombustion of (low ranking) heavy hydrocarbon fractions having a high calorific value, with recycled flue gases collected in a strict loop downstream of the heat recovery,
  quenching the flue gases outletting the combustor in order to lower temperature to values (700-800° C.) compatible with the use of conventional materials in the heat recovery equipments, by direct flue gas recycle, at strict loop and directly under the process pressure, without carrying out cleaning operations or removing undesired species, obtaining the maximum thermodynamic efficiency and the minimum increase both in operating and fixed costs.

As already said, the process of the present invention allows, surprisingly and unexpectedly, to treat hydrocarbon fractions having a very variable vanadium content, also in a range of some orders of magnitude, allowing the removal of $V_2O_5$ and of $NaVO_2$ from the flue gases downstream of the combustor, therefore without no corrosion in the downhill equipments and no sintered or sticky fly ashes that adhere to the walls of these equipments owing to the activation of specific mechanisms (stoichiometric, quantitative) easily adjustable to the most different typologies of vanadium and alkaline metal (in particular sodium) content in fuels. Unexpectedly and surprisingly with the process of the invention there are no penalizations in the efficiency of the energy recovery equipments, as the cleaning of the surfaces of the downhill equipments during a working period even prolonged in time, for example 8,000 h/year, is not required.

For amounts of vanadium higher than 5,000 ppm, vanadium concentrations preferably from about 6,000 to 8.000 ppm are meant.

The amounts of additives used range from 0.5% to 2%. If desired, also higher values can be used.

The following examples are merely given for illustrative purposes and are not limitative of the present invention.

EXAMPLES

Characterization

Analytical Methods
Characterization of the Particulate in Flue Gases

The particulate contained in the combustion flue gases is collected by means of an impactor of the Andersen Mark III type equipped with:
one pre-separator (cyclone) capable to remove particles having an aerodynamic diameter greater than 10 μm, screens for impactor Andersen for particulate PM 10, by using a sampling flow of 14 liter/min, and filters able to separate fractions having particle diameter, respectively, of 10-9 μm; 9-5.8 μm; 5.8-4.7 μm; 4.7-3.3 μm; 3.3-2.1 μm; 2.1-1.1 μm; 1.1-0.7 μm; 0.7-0.4 μm.

The particulate having particle sizes lower than 0.4 μm, that is not retained in the last stage of the impactor Andersen, is filtered on mica filter for analysis with the atomic force microscope by means of a pneumatic actuator that collects, by thermophoretic effect, a sufficient and statistically significant amount of particles. The gaseous flow outletting the impactor is then conveyed into a condensation system of the combustion steam, wherein the submicron particulate is collected, together with a part of the particulate having a diameter lower than 10 nm, in an amount comprised between 1% and 10% by weight of the original particle population having nanometric sizes. The sampling step makes available particle fractions that are then subjected to the chemico-physical analysis by scanning electronic microscopy (SEM) and to the X-ray analysis. The chemical analysis of the single particles is carried out with a microscope SEM PHILIPS XL30, equipped with a thin window EDX system for the microanalysis by energy dispersion spectrometry, by using an automatic system capable to automatically detect the particles when a determined threshold is exceeded.

For each of the identified particles the morphological parameters are determined by measuring the intensities of the lines typical of the X ray spectrum and converting into the corresponding atomic concentrations.
Analysis of the Metals The analysis is carried out by induction-plasma spectroscopy by using an ICP device (inductive coupled plasma)-OES (Thermo Electron Corporation).

For the solid phases, the compounds are analyzed by XRD (XRays Diffraction), combined with ICP.
Soot Analysis Soot analysis is carried out by SEM microscopy.

Partially combusted fuel molecules tend to aggregate themselves into clusters (microaggregates) of different size and very irregular shape.

These particles, called cenospheres and plerospheres, are representative of soot (also known as Diesel Particles, or Black Carbon) and are clearly identifiable at SEM microscope.
Result Evaluation By Andersen Probe, SEM, and EDX analysis cenospheres and plerospheres are not detectable. If present, they are below the sensitivity limits of these analytical methods.

Other analytical methods that have been used are reported under example 1.

The other methods used in the examples are of common practice and well known to the skilled in this art.

For example the flue gases from the reactor are detected by a set of fast response analysis unit (T95, 1.5 seconds), specifically developed by Fisher-Rosemount capable of monitoring both the bulk compounds, $CO_2$, and the "micro" compounds CO, NO, $NO_2$, $SO_2$, and TOC (total organic content, hydrogen flame detector). The analytical units analyze the gases at a frequency of 10 Hertz. The original signal is recorded, skipping the data smoothing software. The closed cycle flue gases of the reactor are monitored in parallel, as soon as they are laminated to atmospheric pressure by a group of FTIR sensors which detect $H_2O$, $CO_2$, $SO_2$, CO, NO, $NO_2$, HCl with a response time of 40 seconds.

Example 1

In a tank equipped with tracings and steam heat exchanger, an oil fraction obtained from the refinery operations of an heavy oil is loaded and collected on the bottom of the vis-breaking section.

At the calorimetry characterization, the hydrocarbon fraction shows a LHV (Low Heating Value) value of 39,350 kJ/kg. The material subjected to pyrolysis at the temperature of 605° C. has an incombustible ash amount of 0.67% by weight. The analysis by optical ICP (ICP-OES) shows that the ashes are mainly formed of alumina and silica and to a lower extent of calcium.

Sodium is in concentration of 4.6% by weight in the ashes. The ashes contain also heavy metals, among which the following ones:
Nickel 46 ppm weight
Vanadium 258 ppm weight By a gear pump fuel is fed to a 5 MW flameless thermal combustor, using as comburent (oxidant) oxygen having a titre 93% by volume, operated at 1,650 K and at the pressure of 5 barg (600 kPa), and inserted in a demonstration plant. The fuel flow rate determined by a Coriolis type fluxmeter is 8.2 kg/min. The injection into the combustor is carried out by means of a nozzle by using pressurized steam for the dispersion (dispersion only, not atomization) of the inletting jet. The steam sent to the nozzle head comes from the heat recovery steam generator, and it is laminated at 13-14 bar, fed at the flow-rate of 65 kg/h, added of water at a rate of 95 kg/h, dispersed in the steam through an atomizer. Oxygen having a titre 99.85% vol. is fed at a flow-rate of 18.2 Nm/min. The used oxygen comes from a cryogenic storage plant equipped with an evaporator. Oxygen is mixed with compressed air added at the flow-rate of 2.4 Nm/min. The gaseous mixture is introduced into the current of the recycled flue gases fed to the combustor to attemper it.

An aqueous solution 0.3 M of magnesium sulphate is prepared. Under stirring, powdered cordierite (200 Mesh, particles average diameter 74 μm) and fumed silica, in amount equal to 10% by weight of the final suspension are added, so as to have a molar ratio $SiO_2$:$Al_2O_3$ 3.4:1 and a ratio Al/Na (Na of the fuel) 1.23. This liquid phase is separately fed to a second injection nozzle at a rate of 0.33 liter/min. The demonstration plant has equipments according to the art.

The flue gases outletting the combustor are cooled in a quencher by mixing with recycled flue gases to a final temperature of about 1,050 K, and sent to the heat recovery equipment (steam generator train, with superheater SH, evaporator EVA and final heat recovery ECO). Downhill of the heat recovery equipment the flue gases, having the temperature of about 520 K, are divided in recycle flue gases (sent to the combustor and to the quencher) compressed by means of a blower and in produced flue gases sent to the FGT section (flue gas post-treatment) after lamination from the pressure of the process to a pressure slightly higher than the atmospheric one.

The produced superheated steam SH (400° C., 40 barg) is quantitated by a calibrated flange before being sent to the condenser.

In the FGT section, the flue gases are filtered on a bag filter with a vermiculite powder precoat, then neutralized with a Venturi type contactor by means of lime milk ($DeSO_x$), before being sent to the stack.

In by pass the section for the sampling of heavy metals is available, that operates by the Andersen impactor (see above), located between the bag filter and the Venturi type contactor.

The analytical equipment for controlling stack emissions is formed of an analyzer battery in continuum, operating on a current continuously sampled from the recycled gases after removal (Peltrier) of moisture, consisting of:

FTIR for the determination of SOx, CO, besides TOC
NDIR for the mass components,
HFID (hydrogen flame detector) for the continuous analysis of TOC (total organic content), and
zirconium probe for oxygen.

In by pass with the stack flue gas powders are sampled for determining total powders and heavy metals (methodologies according to the European regulations).

In the same way, but with a batch modality, flue gases are sampled for 8 hours for determining dioxins, furans, PBC (polychlorobiphenyls), IPA.

An analytical unit is arranged for the batch sampling of the flue gases for specific determinations on the powders (vanadium and besides nickel, magnesium), in the following positions of the process.

Point 1. downstream the combustor, in detail downstream the quencher.
Point 2. downstream the bag filter.
Point 3. downstream the $DeSO_x$ (at the stack).

Powder determination in flue gas is carried out by using the following devices in sequence, (see methodologies (1a) and (1b) (see below)): quartz fiber filter (particle size cut 0.1 µm), condenser positioned in a thermostated bath at 12° C., a drexel filled with water (drexel 1), a drexel filled with acid (drexel 2), and, as last a drexel having a high contact time, filled with an aqueous solution pH 0.5 acidified with nitric acid and brought to an oxidizing power of 1.4 EV by means of hydrogen peroxide, and a drexel 3 liter-counter of the extracted uncondensable fractions.

The run of the combustion process lasted 600 h (25 days).

At the end the plant is disassembled at some specific points for collecting powder samples, for the core sampling of the refractory coatings, for the extraction of the metal specimen (various metals and alloys) for characterization.

Point 3.

Among the values of the analytical determinations in continuum during the run on the flue gas sent to the stack, the following (values expressed in $mg/Nm^3$ of flue gas dry basis) are pointed out:

|     | average | peak value |
| --- | --- | --- |
| CO  | 2.7 | 11 |
| TOC | <0.1 | 1.6 |

The average values of the batch analytical determinations at the stack (see above) (8 determinations, 5 of which in the first week) for parachlorodibenzodioxins/furans (PCDD/F) and polyaromatic hydrocarbons (IPA) were as it follows (referred to flue gas dry basis):

| PCDD/F | ng I-TEQ/$Nm^3$ | 0.0002 |
| --- | --- | --- |
| IPA | µg/$Nm^3$ | <0.05 |

On the flue gas powders, the following average values have been determined, expressed as $mg/Nm^3$ flue gas dry basis, of total powders, Ni, Mn and V, respectively:

| Total powders | 2.1 |
| --- | --- |
| Heavy metals | |
| Ni | 0.011 |
| Mn | 0.004 |
| V | <0.001 |

All the other metals having regulated emissions, each <0.001 $mg/Nm^3$.

The flow rate of the produced flue gases, on a dry basis, calculated by the flow-rate determinations and the composition analyses is of 940 $Nm^3/h$, including a flow-rate of about 50 $Nm^3/h$ of air used for fluxing the analytical instruments and other items.

The batch analyses of the powders in the other sampling points of the process for the characteristic components (V, Ni, Mg) have given the following average results expressed in $mg/Nm^3$ flue gas dry basis.

Point 1.
Downstream of the combustor:
Filter

The powders present in the flue gases have been collected on a ceramic fiber filter (size cut 0.1 µm), dried and weighed. In order to take into account the total volume of dried flue gas of 400 liters, as determined by the volumetric counter, the dry powder amount was multiplied by the factor 1/0.4=2.5, to obtain the corresponding value expressed as $mg/Nm^3$ flue gas dry basis:

| Total powders | 92 |
| --- | --- |

Condenser

In the condenser the water present in combustion fumes is condensed to a dew point of 18° C. 263 ml of condensate are collected on a total dried flue gas volume of 400 liters. The amount of each heavy metal found in the condensate is multiplied by the coefficient 0.236/0.4=0.6575, to give the corresponding amount expressed as $mg/Nm^3$ flue gas dry basis:

| Ni | 0.97 |
| --- | --- |
| Mg | 0.01 |
| V | 0.02 |
| Na | <0.001 |

(the solution has pH 1.1)

Drexel 1+drexel 2 content

In each of the two drexels the solution amount was of 30 ml. These solutions were pooled and the amount of each heavy metal, expressed as $Mg/Nm^3$ flue gas dry basis, was calculated by multiplying the found analytical value by the coefficient 0.06/0.4=0.15. The following values are obtained:

| | |
|---|---|
| Ni | 0.03 |
| Mg | 0.02 |
| V | <0.001. |

Drexel 3

The solution volume in drexel 3 was of 60 ml. By making the calculation as for the heavy metal content of Drexel 1+Drexel 2, the following amounts of heavy metals were found:

| | |
|---|---|
| Ni | <0.001 |
| Mg | <0.001 |
| V | <0.001 |

Part of the solid collected on the filter has been set aside, and the collected fractions pooled and the following analyses have been carried out: the determination of the absolute composition by ICP-OES, the determination of the phases compositions by XRD, the SEM visualization of the micro aggregates.

At the XRD analysis neither $V_2O_5$ or $NaVO_3$ phases are detected.

At the SEM analysis the typical rods of $V_2O_5$ are absent.

$SO_2$ concentration, measured on spot samples of recycled flue gases, is comprised between 0.5 and 1.5 mg/Nm$^3$ flue gas dry basis.

The nitrous slags discharged from the settler and collected in bath, accumulated during the run 600 hours, amount to slightly less than 2 t. The analysis on samples drawn from different bags show that they contain variable amounts of silico-aluminates. The vanadium percentage is on the average 2% by weight.

The inspection performed at the end of the run on the disassembled parts of the plant shows that there are no sticky powders and that the residues deposited in dead zones are in a negligible amount. The DCS data of the process parameters indicative of the heat exchange efficiency show that during the run efficiency has remained substantially constant, in line with the preceding observations.

The collected powders have been analyzed at XRD and SEM. Neither $V_2O_5$ nor $NaVO_3$ phases have been detected.

Specific Characterizations of $V_2O_5$ of Example 1 Carried Out in a Gas Flow Reactor—Methodology (1a)

In a tubular reactor having a 50 mm diameter, made of high purity alumina, thermostatted in an oven at 1400° C., a gaseous current of $CO_2$ and $O_2$ is fed in a molar ratio 90:10 at a rate of 6.3 N liter/min.

Through a Venturi type feeder, an injector disperses in the air flow an aerosol of a 0.1 M vanadium aqueous solution (a solution of $VOSO_4$, vanadylsulphate) at the flow rate of 20 ml/h, for 8 hours.

The gases outletting the tubular reactor are quenched with a metal "finger" cooled with water, passed on a glass fiber filter with a 0.1 μm particle size cut and are then introduced into a flask (condenser) placed in a thermostated bath at 18° C., wherein the excess moisture is condensed. A battery of three drexel type vessels, connected in series, i.e. in succession, drexel 1, drexel 2, drexel 3, is joined by a tube to the outlet of the condenser. In each vessel (drexel) the gas bubbles through a steady aqueous phase, so that the contact liquid/gas takes place with an high efficiency. The first vessel (drexel 1) joined to the condenser, contains 30 ml of demineralized water, the second one (drexel 2) contains 60 ml of acidified water at pH 0.5 with nitric acid, the third and last one (drexel 3) contains 300 ml of acidified water at pH 0.5 with nitric acid and brought to an oxidation potential of 1.4 eV by addition of hydrogen peroxide. After 8 hours the aerosol feeding is stopped and the reactor is kept under a weak flow of dry air at the temperature of 1300° C. for 16 hours.

The operation is repeated three times, as a whole 0.048 gmoles of vanadium, equal to about 2.5 g of vanadium, are fed.

At the end of the test the tubular reactor is disassembled and broken into fragments. By XDR analysis of these fragments it is found that a penetration of $V_2O_5$, quantitatively (ICP) not very significant, has taken place in the reactor walls.

The condenser is disassembled and the internal surface of the flask, after removal of the condensate from the bottom of the flask, is cleaned by means of a spatula and then with a washing acid aqueous solution. The washing solution is then pooled with the condensate liquid phase. The final volume of the condensate liquid phase is found to be 430 cc. This phase is subjected to ICP analysis. Likewise, the solution of drexel 1 is subjected to ICP analysis.

The vanadium concentration in the analyzed samples is <0.01 μg/liter.

The liquid phase contained in drexel 2 is analyzed by ICP. The vanadium concentration is <0.01 μg/liter.

It is noted that the addition of drexels 1 and 2 has no impact on the vanadium mass balance, as the vanadium concentration is below the analytical sensitivity limit.

In drexel 3 the vanadium concentration is of 1.6 mg/liter, equal to a collected vanadium amount of 0.016 gmoles.

By multiplying the amount in g/liter by the volume of the solution (0.3 liter) it is found that the vanadium amount in the drexel is of 0.48 g, that is about 20% of the inletting vanadium.

Second part of the methodology (1a)

By operating under the same conditions as in the first part but with the following modifications:
halving the flow rate of the vanadium solution and of the transport gas,
by providing in drexel 3 a solution volume of 450 cc with a more efficient dispersion and a longer contact time, thus with a very high efficiency, the concentration of the recovered vanadium is 1.98 g/liter.

The mass balance closing value is >70%, that results more acceptable, the corpuscolar nature of $V_2O_5$ generated in the reaction gas flow can be shown.

Specific Characterization of $V_2O_5$ of Example 1 Carried Out in a Gas Flow Reactor—Methodology (1b))

In a tubular reactor of the same type as that used in methodology (1a), a gaseous current of $CO_2$ and $O_2$ is fed in a molar ratio 90:10, at a flow rate of 6.3 N liter/min and $SO_2$ analytical grade directly from a bomb at a flow rate of 0.01 N liter/min.

Through a Venturi type feeder, an injector disperses in the oxygen flow an aerosol of an aqueous solution obtained by mixing:
0.1 M $VOSO_4$ (vanadylsulphate),
0.125 M $MgSO_4$ (water-soluble magnesium sulphate),
to have a molar ratio magnesium:vanadium 1:1.25, the flow rate being 20 ml/hour.

The experiment lasts 8 hours.

The gases outletting the tubular reactor are cooled as described in methodology (1a), then they are sent on a glass fiber filter with a 0.1 µm particle size cut and in sequence, to the same equipments described in the methodology (1a) second part as regards the high efficiency drexels.

The test is carried out with the same modalities and times described in the methodology (1a) for a total feeding of 0.048 gmoles of vanadium (about 2.5 g).

At the end of the test the tubular reactor is disassembled and reduced into fragments. The surfaces of the fragments forming the internal wall of the tubular reactor, that during the test have been into contact with the vanadylsulphate aerosol, at the visual inspection look dark-coloured, with a more evident thickness especially in the part of the external tube outletting the oven. However the XDR analysis on these fragments does not show vanadium penetration. The analysis of the dark surface layer carried out by XRD, shows the presence only of the phases magnesium orthovanadate and magnesium pyrovanadate.

The solid deposit on the filter is analyzed by XRD, combined with ICP analysis. The weight of the collected solid is 47 mg. Upon dissolution in an aqueous phase, by ICP it is found that the amount of vanadium in the collected solid is 15.6 mg.

The condenser is disassembled, the internal surface carefully washed with an aqueous acid solution, that is then weighed and pooled with the condensate collected at the bottom of the condenser. The volume of the recovered solution is of 425 cc.

The ICP analysis shows that magnesium and vanadium are present at molar ratios Mg/V intermediate ratios between the stoichiometry of magnesium orthovanadate and magnesium pyrovanadate. In the collected fraction 0.9 mg of vanadium are present.

Likewise, the liquid phase contained in drexel 1 is subjected to ICP analysis. The vanadium concentration, measured by ICP, results below the sensitivity analytical limit (<0.01 µg/liter).

The same for the liquid phases of both drexel 2 and drexel 3, respectively.

The closing mass balance for the vanadium is 96%, taking also into account of the material deposited on the alumina tubular reactor and on the cold finger.

Specific Characterization $V_2O_5$ of Example 1: Carried Out in a Gas Flow Reactor—Methodology (1c))

In a tubular reactor of the same type as that used in methodology (1a), a gaseous current of $CO_2$ and $O_2$ is fed in a molar ratio 90:10, at a rate of 3.3 N liter/min, $SO_2$ analytical grade is also fed from a bomb at a flow rate of 0.01 N liter/min.

By a Venturi type feeder, an injector disperses in the oxygen flow an aerosol of an aqueous solution obtained by mixing:
0.2 M $VOSO_4$ (vanadylsulphate),
0.3 M $MgSO_4$ (water-soluble magnesium sulphate),
0.2 M $Na_2SO_4$ (sodium sulphate)
wherein the molar ratio vanadium:magnesium is 1:1.5, the flow rate is 20 cc/hour.

A solid fraction is also fed under the form of micronized powder, formed of:
cordierite $Mg_2Al_4Si_5O_{18}$ at a flow rate 14.6 mg/Nm$^3$,
calcium silicate $Ca_2SiO_4$ at a flow rate 0.775 mg/Nm$^3$.

The test is carried out for 20 hours as a whole (two tests each of 10 hours). The flow rate is 200 Nlt/h.

The gases outletting the tubular reactor are cooled as described in methodology (1a). Then they are sent to a glass fiber filter with a 0.1 µm particle size cut, then in sequence, to the same equipments described in methodology (1a), second part. The test is carried out with the same modalities and times described in the preceding example. 0.080 gmoles of vanadium, corresponding to 4.075 g are as a whole fed.

At the end of the test the tubular reactor is disassembled and reduced into fragments. The surfaces of the fragments forming the internal wall of the tubular reactor, that during the test have been into contact with the vanadylsulphate aerosol, at the visual inspection appear dark-coloured, with a more evident thickness especially in the part of the external tube outletting the oven. The XDR Analysis on these fragments does not show any vanadium penetration. The analysis of the dark surface layer carried out by XRD, evidences the presence of the phases magnesium orthovanadate and magnesium pyrovanadate only.

The solid residue deposited at the bottom of the tubular reactor was collected. Its weight was 30.5 g. The analysis of the crystalline phases on this sample, carried out with XFRD, shows the presence of the phases $NaAlSiO_4$, magnesium orthovanadate ($Mg_3V_2O_8$), magnesium pyrovanadate ($Mg_2V_2O_7$), calcium silicate ($Ca_2SiO_4$), cordierite ($Mg_2Al_4Si_5O_{18}$). The elementary analysis carried out by XRF (X-Ray Fluorescence), has given the following results:

| Metal | g |
| --- | --- |
| Sodium | 3.4 |
| Aluminium | 9.15 |
| Silicon | 16.28 |
| Magnesium | 7.35 |
| Vanadium | 3.3 |
| Calcium | 7.70 |

It is noted that the vanadium content in this sample corresponds to 81% of the fed vanadium.

The glass fiber filter shows a solid deposit that is analyzed by XRD for the crystalline phases and by XRF for elementary analysis. The weight of the collected solid is 0.62 g. The crystalline phases have been identified to correspond to $V_2O_5$, $SiO_2$ and $Mg_3V_2O_8$, respectively.

The elementary analysis carried out by XRF has given the following results (figures, as above, are given in grams):

| | |
| --- | --- |
| Silicon | 0.10 |
| Magnesium | 0.0514 |
| Vanadium | 0.10 |

Vanadium in this sample corresponds to 2.4% of the fed amount.

The condenser is disassembled, the internal surface carefully washed, following the same procedure described in methodology (1a), the washing acid solution is joined to the condensate collected on the bottom of the condenser.

The volume of the recovered solution is 425 cc.

The ICP analysis shows that magnesium and vanadium are present at ratios Mg/V intermediate between the stoichiometry of magnesium orthovanadate and magnesium pyrovanadate.

The collected fraction contains 0.9 mg of vanadium.

Likewise, the liquid phase contained in drexel 1 is subjected to ICP analysis. The vanadium concentration, measured by ICP, results below the sensitivity limit (<0.01 µg/liter).

In the analyses of the content of the liquid phases respectively of drexel 2 and drexel 3, no vanadium is found below the sensitivity limit.

The closing mass balance of the vanadium found in the cooling pipe and in the filter (in the drexels the vanadium content is negligible) is therefore of 83.4%.

Example 2 Comparative

The same 5 MWt demonstration unit is operated under the same modalities reported in example 1, but the fuel is fuel oil Bunker-C containing 41 ppm of vanadium. The fuel feeding rate is 7.8 kg/min.

The combustion is carried out without the addition of additives for a run of 120 hours.

At the end, after cooling and disassembling the parts of the equipments, the ashes deposited on the walls of the heat recovery steam generator and in the elbows of the flue gas piping are collected.

The ICP-OES analysis of these ashes shows that the vanadium amount is 2.6% by weight.

By XRD it is also possible to identify in the ashes the phases of $V_2O_5$ and of $NaVO_3$ and, by SEM, the typical rods of $V_2O_5$.

At the bottom of the economizer (ECO), on the surfaces of the heat exchange tubes iron sulphates are present. The specimens of alloyed material (AISI 304H) are found already degraded on the surface by formation of nickel vanadates (nickel deriving from the alloyed material).

The invention claimed is:

1. Oxycombustion process comprising feeding to a combustor:
    a fuel selected from low ranking gaseous, liquid, solid, also solid melting hydrocarbon fractions, having a vanadium content in amounts by weight from 50 to 5,000 ppm or higher, and alkaline metals Ma in amounts from 20 to 10,000 ppm, the hydrocarbon fractions being fed in admixture with water or steam, the amount of water/steam being at least 30% by weight with respect to the hydrocarbon fractions;
    magnesium as oxide, or as a magnesium compound forming MgO in the combustion process, or mixtures thereof;
    a silico aluminate wherein the molar ratio $SiO_2:Al_2O_3$ ranges from 2:1 to 6:1;
    oxygen as oxidant, having a titre higher than 80% by volume, the complement to 100% being formed of inert gases and/or nitrogen, being in admixture with:
    water or steam, the ratio by moles oxidant:(water or stream) being between 1:0.4 and 1:3,
    or
    recycled flue gases having a water or stream amount higher than 30% by volume, the molar ratio oxidant:(water or stream) in flue gases being comprised between 1:0.4 and 1:3, the recycled flue gases coming from the energy recovery equipments;
    the combustor being refractored, isotherm or quasi-isotherm, flameless, operating at temperatures in the range 1,250°-1,450° C. and under pressurized conditions.

2. A process according to claim 1 wherein a pressure in the combustor is comprised from higher than or equal to 102 kPa to 5,000 kPa.

3. A process according to claim 1 wherein a pressure in the combustor is comprised from higher than or equal to 200 kPa to 3,500 kPa.

4. A process according to claim 1 wherein the oxidant is pure oxygen.

5. A process according to claim 1 wherein the Mg:V molar ratio is in the range 1:1-2:1.

6. A process according to claim 5 wherein the Mg:V molar ratio ranges from 1.25:1 to 1.75:1.

7. A process according to claim 1 wherein the molar ratio of Mg:Al is comprised between 0.5:1 and 1:1.

8. A process according to claim 7, wherein the molar ratio of Mg:Al is comprised between 0.6:1 and 0.8:1.

9. A process according to claim 1 wherein the added amount of silico aluminate, on a molar basis, with respect to the alkaline metals Ma contained in the fuel is in the molar ratio Al/Ma>1.

10. A process according to claim 9, wherein the molar ratio Al/Ma is between 1 and 1.5.

11. A process according to claim 1 wherein the temperature in the combustor ranges from 1300° to 1400° C.

12. A process according to claim 1 wherein the hydrocarbon fractions are selected from asphaltene, petrolene, carbonaceous substances, Petcoke, carbonaceous residues of petrochemical processes, and heavy refinery bottoms.

13. A process according to claim 1 wherein the addition of magnesium is carried out by feeding an aqueous solution of magnesium sulphate.

14. A process according to claim 1 wherein the silico aluminate is a magnesium silico aluminate, optionally added of $SiO_2$ in order to have a $SiO_2:Al_2O_3$ ratio ranging from 2:1 to 6:1.

15. A process according to claim 1, wherein the residence time of the fuel in the combustor ranges from 0.5 seconds up to 30 minutes.

16. Flue gases obtainable with the process according to claim 1, wherein (data on a flue gas dry basis):
    absent soot and IPA <$10^{-4}$ mg/Nm$^3$,
    TOC<1 ppm,
    fly ash <100 mg/Nm$^3$,
    magnesium <1 mg/Nm$^3$,
    vanadium and its compounds orthovanadate and pyrovanadate≤1 mg/Nm$^3$ expressed as vanadium, and $V_2O_5$<0.01 mg/Nm$^3$,
    $SO_3$≤2 mg/Nm$^3$,
    NiO≤1 mg/Nm$^3$,
    $NaVO_3$ not detectable by XRD, and SEM analysis of the microaggregates.

17. The process according to claim 1 wherein the water is added to the recycled flue gases.

* * * * *